(12) United States Patent
Mao

(10) Patent No.: US 8,837,875 B2
(45) Date of Patent: Sep. 16, 2014

(54) OPTICAL PATH SWITCH AND OPTICAL ROUTER

(75) Inventor: Jianhong Mao, Shanghai (CN)

(73) Assignee: Lexvu Opto Microelectronics Technology (Shanghai) Ltd, Shanghai (CN)

( * ) Notice: Subject to any disclaimer, the term of this patent is extended or adjusted under 35 U.S.C. 154(b) by 94 days.

(21) Appl. No.: 13/704,917

(22) PCT Filed: Jan. 26, 2011

(86) PCT No.: PCT/CN2011/070628
§ 371 (c)(1),
(2), (4) Date: Dec. 17, 2012

(87) PCT Pub. No.: WO2011/157065
PCT Pub. Date: Dec. 22, 2011

(65) Prior Publication Data
US 2013/0094803 A1    Apr. 18, 2013

(30) Foreign Application Priority Data

Jun. 18, 2010    (CN) .......................... 2010 1 0207878

(51) Int. Cl.
*G02B 6/35*    (2006.01)
*G02B 6/28*    (2006.01)

(52) U.S. Cl.
CPC .............. *G02B 6/3506* (2013.01); *G02B 6/357* (2013.01); *G02B 6/3512* (2013.01); *G02B 6/3566* (2013.01); *G02B 6/3542* (2013.01); *G02B 6/3546* (2013.01)
USPC .................... 385/18; 385/19; 385/22; 385/24

(58) Field of Classification Search
CPC .................................................. G02B 6/3566
See application file for complete search history.

(56) References Cited

U.S. PATENT DOCUMENTS

| | | | | |
|---|---|---|---|---|
| 4,065,677 A | * | 12/1977 | Micheron et al. | 307/112 |
| 4,078,183 A | * | 3/1978 | Lewiner et al. | 307/112 |

(Continued)

FOREIGN PATENT DOCUMENTS

| | | |
|---|---|---|
| CN | 1343318 A | 4/2002 |
| CN | 101158747 A | 4/2008 |

(Continued)

OTHER PUBLICATIONS

Wood R.L, Madadevan R, and Hill E., "MEMS 2-D Matrix Switch", in the proceedings of the Optical Fiber Communications Conference in Mar. 2002 (in English).

(Continued)

*Primary Examiner* — Mark Robinson
*Assistant Examiner* — Andrew Jordan
(74) *Attorney, Agent, or Firm* — Harness, Dickey & Pierce, P.L.C.

(57) ABSTRACT

An optical path switch and an optical router are provided. The optical path switch comprises an input optical path (100), two output optical paths (201, 202), and an optical path switching element (300). The optical path switching element selectively routes the beam from the input optical path to one of the output optical paths. The optical path switching element comprises a semiconductor substrate (301), an inter-layer dielectric layer (307) on the surface of the semiconductor substrate, a cavity (302) disposed in the inter-layer dielectric layer, and an elastic light guiding plate (306) disposed in the cavity. One end of the cavity is connected with the input optical path, and the other end is separated into an upper cavity (304) and a lower cavity (305) by an isolating layer (303).

17 Claims, 4 Drawing Sheets

(56) References Cited

U.S. PATENT DOCUMENTS

| | | | | |
|---|---|---|---|---|
| 4,204,744 | A | * | 5/1980 | Wittmann ............ 385/22 |
| 4,205,242 | A | * | 5/1980 | Micheron et al. ............ 307/400 |
| 5,612,815 | A | * | 3/1997 | Labeye et al. ............ 359/320 |
| 6,539,143 | B1 | * | 3/2003 | Hunter ............ 385/19 |
| 6,633,692 | B2 | | 10/2003 | Chua et al. |
| 6,721,473 | B1 | | 4/2004 | Islam et al. |
| 8,346,034 | B2 | | 1/2013 | Hayakawa et al. |
| 2002/0163053 | A1 | | 11/2002 | Behin et al. |
| 2013/0094803 | A1 | * | 4/2013 | Mao ............ 385/16 |

FOREIGN PATENT DOCUMENTS

| | | |
|---|---|---|
| CN | 101680996 A | 3/2010 |
| CN | 102289067 B | 2/2013 |

OTHER PUBLICATIONS

International Search Report (in English and Chinese) and Written Opinion of the International Searching Authority (in Chinese) for PCT/CN2011/070628, mailed Apr. 28, 2011; ISA/CN.

* cited by examiner

OPTICAL PATH SWITCH AND OPTICAL ROUTER

CROSS REFERENCE TO RELATED APPLICATIONS

The present application is a Section 371 National Stage Application of International Application No. PCT/CN2011/070628, filed on Jan. 26, 2011, which claims the priority of Chinese Patent Application No. 201010207878.4, entitled "Optical Path Switch and Optical Router", and filed on Jun. 18, 2010, the entire disclosure of which is incorporated herein by reference.

FIELD OF THE DISCLOSURE

The present disclosure generally relates to optical fibre communication field, and more particularly, to an optical path switch and an optical router using micro electronic mechanical system (MEMS) technology.

BACKGROUND OF THE DISCLOSURE

With development of society, requirements for capacity and quality of information in network communication become increasingly high, so does social requirements for broad band videos, multi media services and other real time services based on IP. Those new services take a great deal of bandwidth, which promotes high speed broadband network development in communication field. Compared with a conventional electrical signal transmission network, optical fiber network becomes a main developing direction, because it provides enormous bandwidths, and good load bearing capacities and safe encryption functions. Among many network realization solutions, a network with combination of optical signals and electrical signals is limited by the maximum working speed of electrical devices, and especially limited by the poor processing ability of switching/routing, which results in a bandwidth bottleneck. An all-optical network solution based on optical fiber can break through the bandwidth bottleneck and meet requirements of high speed bandwidth services, because of its high speed, large-capacity transmission and great exchange processing ability.

In an all-optical network, optical information flows are transmitted, exchanged, and routed in a form of light beams, without need of optical-to-electrical and electrical-to-optical conversions. In the all-optical network solution, optical path switches and routers is a crucial optical technical nodes, which are mainly adapted for exchanging and routing optical signals passing through the optical nodes between any optical interfaces.

It is well known that the micro electronic mechanical system (MEMS) processes can be used to manufacture an optical router. For example, a paper by Wood R. L, Madadevan R, and Hill E in the proceedings of the Optical Fiber Communications conference in March, 2002, discloses a two-dimensional matrix optical router based on MEMS. A structural schematic view of the two-dimensional matrix optical router is shown in FIG. 1. The router includes a two-dimensional pop-up MEMS reflector matrix configured in a free space. In the matrix, reflectors located on every matrix node may be started with a rotary pop-up by an electromagnetic deflection control mechanism (not shown in FIG. 1) and be kept stable at a specific deflection angle. When a light beam is transmitted to a node and irradiates on a reflector, the reflector's deflection angle determines a reflection direction of the beam, so that the beam can be selectively transmitted to any other nodes. As shown in FIG. 1, a light beam input from an input end In is sequentially reflected by reflectors 1, 2 . . . 5, and finally output by an output end Out, and thus the light beam is routed from the input end In to the output Out.

However, in the MEMS reflector matrix of the above optical router, the electromagnetic deflection control mechanism of reflectors at each node is complex in structure, resulting in a large size of the router. Besides, it is difficult to accurately control the deflection angle, which may induce a lateral offset error which may be accumulated and amplified after multiple nodes, and further reduce the coupling efficiency of the input light beam.

BRIEF SUMMARY OF THE DISCLOSURE

In the present disclosure, it is desire to provide a optical router, so as to avoid offset error is accumulated in the optical router.

An embodiment of the present disclosure provides an optical path switch, including: an input optical path, two output optical paths and an optical path switching element, and the optical path switching element is adapted for selective routing light beams from the input optical path to one of the output optical paths.

The optical path switching element includes: a semiconductor substrate, an inter layer dielectric layer on the substrate, a cavity in the inter layer dielectric layer, wherein an end of the cavity is connected with the input optical path, the other end is partitioned into an upper cavity and an lower cavity by an isolating layer, the upper and lower cavities are respectively connected with the two output optical paths; and an elastic light guiding plate in the cavity, wherein the elastic light guiding plate includes a reflecting material and includes a fixed end connected with the isolating layer and a free end facing the input optical path and suspending in the cavity, wherein the free end can move between the top and bottom of the cavity under a force field exerted in the cavity.

The optical path switching element may further include an upper inducing plate and a lower inducing plate which are respectively located above the top and below the bottom of the cavity, wherein a force field perpendicular to an optical transmission path is formed by electrifying the upper and the lower inducing plates in the cavity, and the free end of the elastic light guiding plate is in the force field.

Optionally, the upper and lower inducing plates are configured on the walls of the cavity or as a part of the walls of the cavity, and the walls are insulated from the rest part.

Optionally, the upper and lower inducing plates are located in the inter layer dielectric layer and are insulated from the walls of the cavity by the inter layer dielectric layer.

Optionally, the semiconductor substrate includes a silicon substrate or a silicon on insulation substrate.

Optionally, a reflecting coating is formed on the internal surfaces of the cavity.

Optionally, the walls of the cavity include metal.

Optionally, the walls of the cavity include one selected from aluminum, titanium, zinc, silver or a combination thereof.

Optionally, the elastic light guiding plate includes metal.

Optionally, the surfaces of the elastic light guiding plate are formed with a silicon oxide or silicon nitride film thereon.

Optionally, the elastic light guiding plate includes one selected from aluminum, titanium, zinc, silver or a combination thereof.

Optionally, a width of the free end of the elastic light guiding plate is greater than a width of the fixed end.

Optionally, a section of the cavity perpendicular to the optical paths is a rectangle, and a width of the section gradually reduces along a direction extending from the free end of the elastic light guiding plate to the fixed end to keep clearance between the elastic light guiding plate and the walls of the cavity have a consistent width.

Optionally, the upper and lower cavities are filled with a non-light tight material.

Optionally, the upper and lower cavities are filled with quartz or glass comprising silicon dioxide.

Another embodiment of the present disclosure further provides an optical router including multiple stages of optical path switches as described above, including: at least one input end, and multiple output ends, wherein the input end is connected with an input optical path of an optical path switch in a first stage, the output ends are connected with output optical paths of optical path switches in a last stage, and an input optical paths of an optical path switch in each stage is connected with an output end of an optical path switch in a former stage.

According to the embodiments of the present disclosure, the optical router uses the optical path switches as optical path nodes, which has a simple structure, and can be easily controlled. Moreover, after passing through an alternative selective routing, there is no lateral offset for light beams in the conventional reflector matrix, and even if after multiple stages of selective routing, there is no accumulated offset error caused in the optical router.

BRIEF DESCRIPTION OF THE DRAWINGS

In order to clearly clarify the objects, characteristics and advantages of the present disclosure, specific embodiments and examples are described herein in conjunction with the attached drawings. It should be noted that, in the accompanying drawings, for convenience of description, the sizes of respective components may not be drawn based on actual scales. Also, the same or similar reference signs represent the same or similar components in the accompanying drawings.

DETAILED DESCRIPTION OF THE DISCLOSURE

Mostly, a conventional optical router includes a reflector matrix, which includes multiple rotatable reflectors configured in a free space. The reflectors are adapted for reflecting light beams multiple times to realize selective routing of optical paths. The rotating accuracy of the reflectors at every matrix node is required to be high, because any tiny offset error may be increased several times over after multiple layers of reflections by the reflectors. Therefore, manufacturing cost of a conventional optical router is high, because of the great complexity of control units of the router and the high accuracy requirement. In the present disclosure, an optical router including alternative optical path switches in multi stages are used to form a closed path guide beam and to realize selective routing of optical paths. On one side, the optical path switch has a simple structure which is easy to be manufactured. Moreover, there is no lateral offset of light beams and accumulation of offset errors can be avoided.

The optical path switch and the optical router provided in the present disclosure are described in detail hereinafter, in conjunction with specific embodiments and examples.

Figure 1:
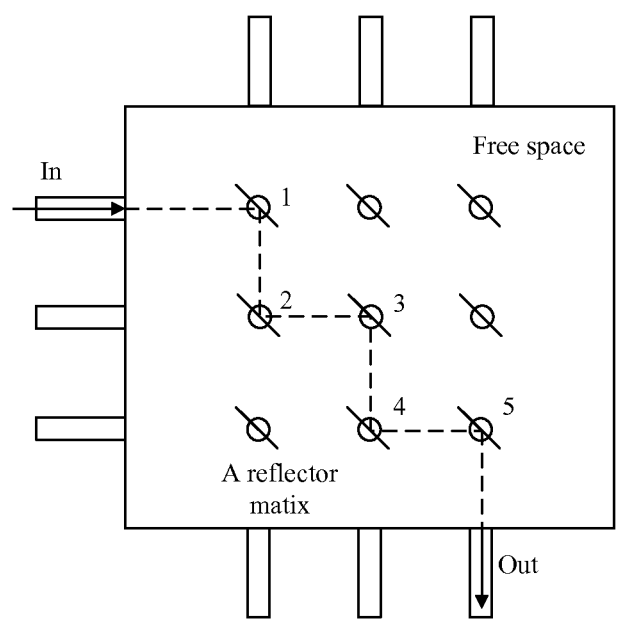
FIG. 1 is a structural schematic view of a conventional optical router.
Figure 2:
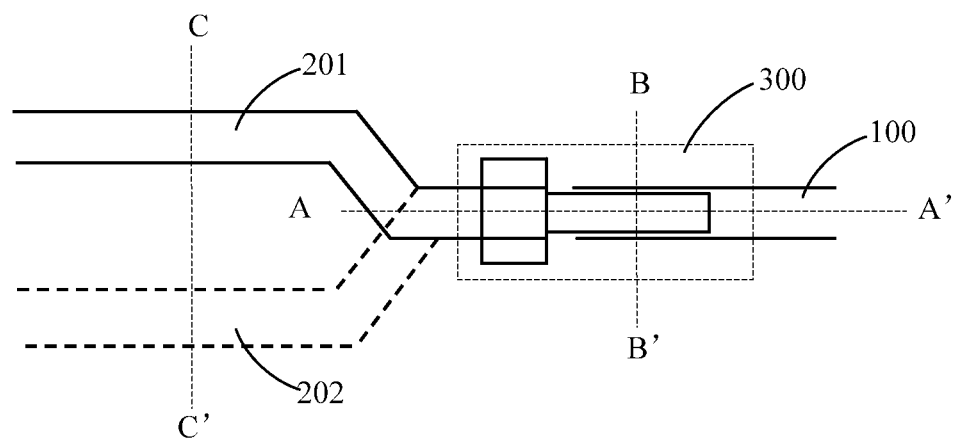
FIG. 2 is a structural schematic view of an optical path switch in an embodiment of the present disclosure.

FIG. 2 is a structural schematic view of an optical path switch in an embodiment of the present disclosure. The optical path switch includes an input optical path 100, an output optical path 201, an output optical path 202, and an optical path switching element 300. The optical path switching element 300 is adapted for selectively routing a light beam from the input optical path 100 to one of the output optical paths, namely, the optical path switching element 300 only has two routing states.

Figure 3:
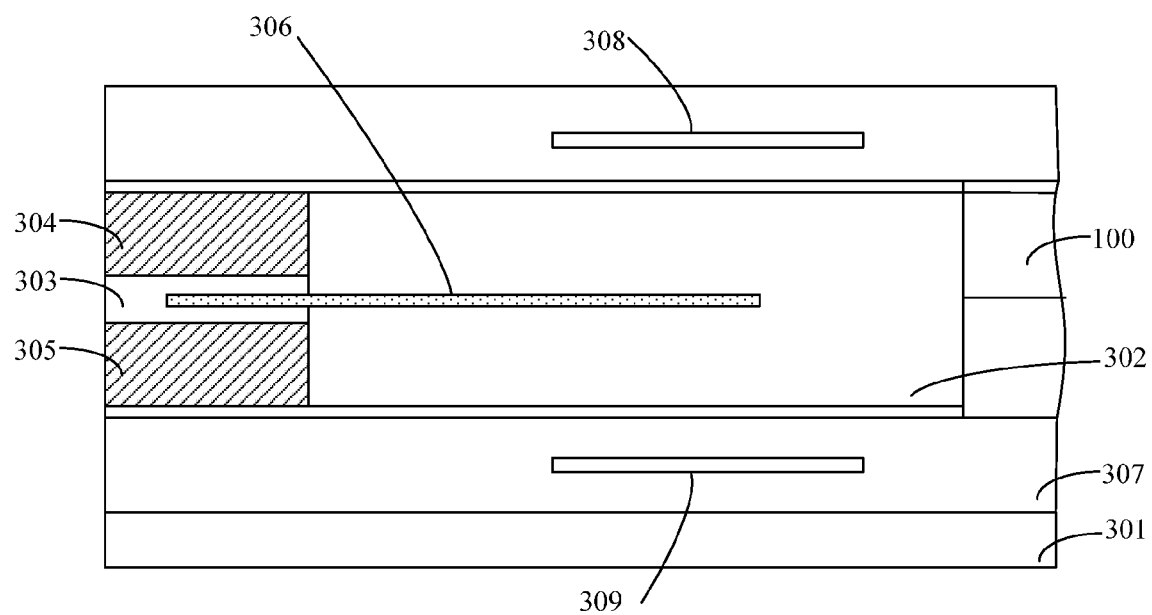
FIG. 3 is schematic sectional view of FIG. 2 along an A-A' direction.

FIG. 3 is schematic sectional view of FIG. 2 along an A-A' direction. As shown in FIG. 3, the optical path switching element 300 includes: a semiconductor substrate 301, an inter-layer dielectric (ILD) layer 307 on the semiconductor substrate 301, a cavity 302 in the ILD layer 307, and an elastic light guiding plate 306. An end of the cavity 302 is connected with the input optical path 100, the other end is partitioned into an upper cavity 304 and a lower cavity 305 by an isolating layer 303, and the upper cavity 304 and the lower cavity 305 are respectively connected with the two output optical paths. The elastic light guiding plate 306 includes a fixed end connected with the isolating layer 303, and a free end suspended in the cavity 302 and facing the input optical path 100. Under influence of a force field exerted in the cavity 302, the free end may move between top and bottom of the cavity 302 to bend the elastic light guiding plate 306.

To form the force field for bending the elastic light guiding plate 306, the optical path switching element 300 further includes an upper inducing plate 308 and a lower inducing plate 309 which are respectively located above the top and below the bottom of the cavity 302. By electrifying the upper and lower inducing plates 308 and 309, a force field is formed in the cavity 302, being perpendicular to an optical path therein, and the free end is located in the force field. The upper and lower inducing plates 308 and 309 include metal, such as copper, aluminum, tungsten and the like, and may be configured on walls of the cavity 302 or directly as a part of the walls of the cavity 302, or configured in the ILD layer 307 outside of the cavity 302.

In an embodiment, while the optical path switching element 300 is working, the upper and lower inducing plates 308 and 309 are electrified to form a force field in the cavity 302, and charges are implanted into the elastic light guiding plate 306 through a connected electrode. The charges concentrates in the free end of the elastic light guiding plate 306 because of tip effect and under influence of the force field, the free end moves to the top or bottom of the cavity 302, to control the bending direction and the bending degree of the elastic light guiding plate 306. In another embodiment, the elastic light guiding plate 306 may include a magnetic material, and an electromagnetic field is formed by electrifying the upper and lower inducing plates 308 and 309 to control the bending direction and the bending degree of the elastic light guiding plate 306. It should be noted that, if the upper and lower inducing plates 308 and 309 are configured on some walls of the cavity 302 or directly as a part of the walls of the cavity 302, the walls need be electrically insulated from the rest walls, to avoid electrical short and leakage which may happen between the upper and lower inducing plates 308 and 309 through the walls of the cavity 302.

Further, the elastic light guiding plate 306 is platelet, so there is a bending direction for the elastic light guiding plate 306. To make sure the bending direction of the elastic light guiding plate 306 matches with positions of the upper and lower inducing plates 308 and 309 and a section of the upper or lower cavity 304 or 305 can be sealed off after bending of the elastic light guiding plate 306, an elastic surface of the elastic light guiding plate 306 needs be perpendicular to its projecting plane between the upper and lower inducing plates 308 and 309. The fixed end of the elastic light guiding plate 306 is between the upper cavity 304 and the lower cavity 305. The free end of the elastic light guiding plate 306 extends in to the cavity 302.

It should be noted that, in MEMS devices, the optical path switching element 300 includes a structure which is compatible with semiconductor processes, and the upper and lower inducing plates 308 and 309, and the elastic light guiding plate 306 are connected with electrodes. In an embodiment, the fixed end of the elastic light guiding plate 306 extends from the isolating layer 303 into the ILD layer 307, to form a contact via and to connect an electrode. The contact via connects the light guiding plate 306 and a control signal input metal through the isolating layer 303 and ILD layer 307. In the embodiment, the above metal interconnection structure is not shown and described in detail herein, because it is a well know technology, and those skilled in the art can manufacture the contact via according to practical requirements of metal interconnection.

The semiconductor substrate 301 includes a silicon substrate or a silicon on insulation (SOI) substrate. The cavity 302 is formed in the ILD layer 307 on the substrate 302. The ILD layer 307 is adapted for isolating the cavity 302 and includes silicon dioxide, silicon nitride, and the like.

Internal surfaces of the cavity 302 are capable of reflecting light beams. In an embodiment, a reflecting coating is formed on the internal surfaces of the cavity 302. In another embodiment, the internal surfaces of the cavity 302 include a metal material with high reflectivity, such as one selected from aluminum, titanium, zinc and silver, or a combination thereof. In a preferable embodiment, in order to lower manufacturing costs and be compatible with semiconductor processes, the internal surfaces of the cavity 302 may include aluminum.

The elastic light guiding plate 306 is capable of reflecting light beams and bending in the cavity 302. In an embodiment, the elastic light guiding plate 306 includes a metal material with high reflectivity, such as one selected from aluminum, titanium, zinc and silver, or a combination thereof. Further, for improving metal fatigue caused by frequent bending while using the elastic light guiding plate 306, a thin silicon oxide or silicon nitride film is formed on the elastic light guiding plate 306 to increase its surface tension. In a preferable embodiment, in order to lower manufacturing costs and be compatible with semiconductor processes, the elastic light guiding plate 306 includes aluminum and has a silicon nitride film formed on its surfaces. Besides, because aluminum is conductive, to avoid short caused by the elastic light guiding plate 306 contacting the upper or lower inducing plate 308 or 309 when the free end of the elastic light guiding plate 306 moves to the top or bottom of the cavity 302, the upper and lower inducing plates are configured in the ILD layer 307 outside of the cavity 302 and isolated from the walls of the cavity 302 by the ILD layer 307.

Figure 4:
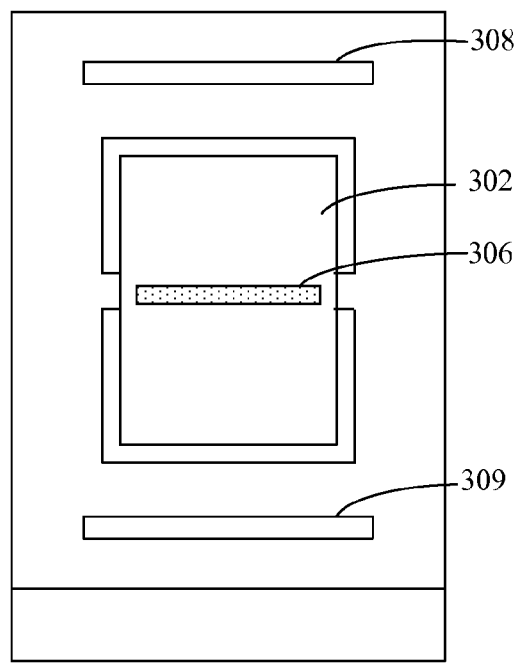
FIG. 4 is a schematic sectional view of FIG. 2 along a B-B' direction.

In light of the foregoing, the free end of the elastic light guiding plate 306 is capable of moving to the top or bottom of the cavity 302 to make the elastic light guiding plate 306 bend and stop light beams from the input optical path coming into the upper or lower cavity 304 or 305. To enhance the bending ability of the elastic light guiding plate 306, a width of the free end of the elastic light guiding plate 306 is configured to be greater than a width of the fixed end. FIG. 4 is a schematic sectional view of FIG. 2 along a B-B' direction. As shown in FIG. 4, for simplifying manufacturing processes, a section of the cavity 302 perpendicular to an optical path may be a rectangle. Furthermore, to reduce light leaking through clearance between the elastic light guiding plate 306 and the walls of the cavity 302 after the elastic light guiding plate 306 bends, a width D of the cavity 302's section gradually reduces along an direction extending from the free end to the fixed end of the elastic light guiding plate 306, to keep the clearance has a consistent width. In other embodiments, the section of the cavity 302 may be an ellipse, a trapezoid, or the like, as long as the elastic light guiding plate 306 can move freely in the cavity 302 and the beams can be stopped from coming into upper or lower cavity 304 or 305.

Figure 5:
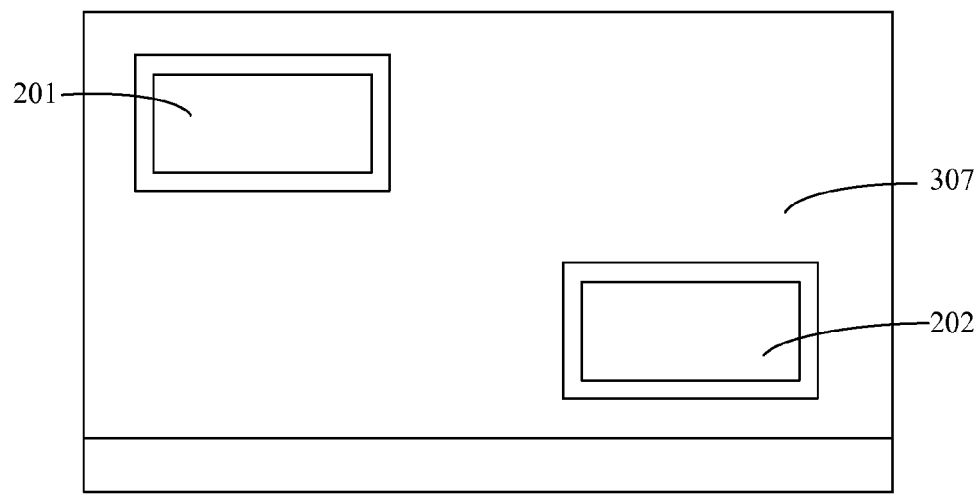
FIG. 5 is a schematic sectional view of FIG. 2 along a C-C' direction.

FIG. 5 is a schematic sectional view of FIG. 2 along a C-C' direction. With combination of FIGS. 2 and 5, in an optional embodiment, A portion of the upper and lower cavity 304 and 305 near an end of the elastic light guiding plate 306 (left end of the elastic light guiding plate 306 in FIG. 3) constitute a stack structure, the rest portion the upper and lower cavity 304 and 305 far away from the end of the elastic light guiding plate 306 are separated from each other.

Figure 6:
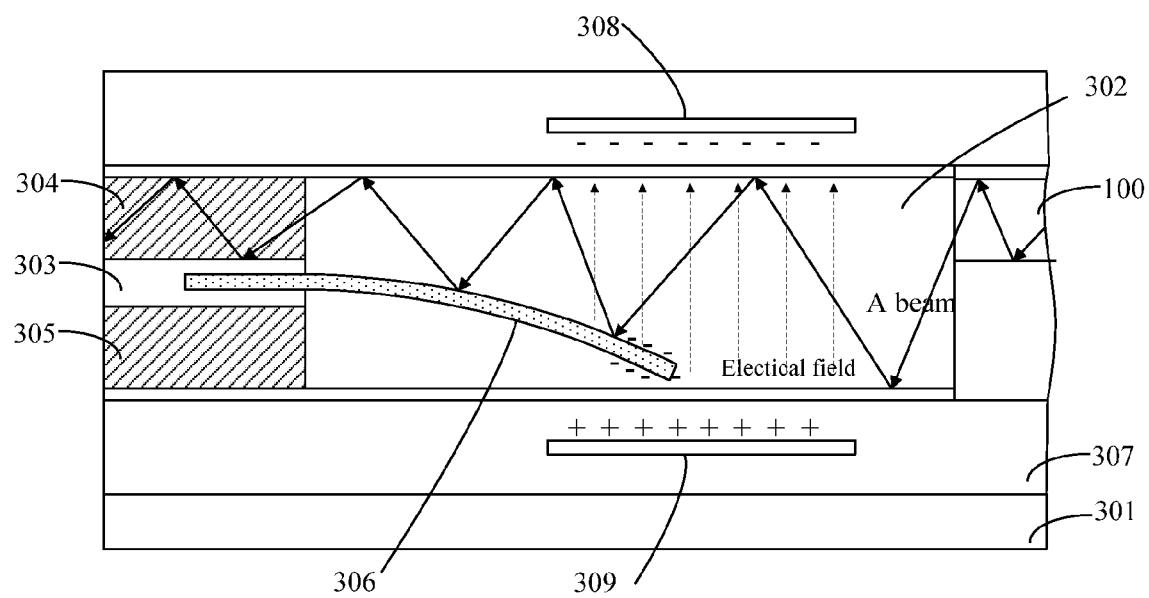
FIG. 6 is a schematic view for illustrating working mechanism of an optical path switch in an embodiment of the present disclosure.

FIG. 6 is a schematic view for illustrating working mechanism of an optical path switch in an embodiment of the present disclosure. The working mechanism of the optical path switch is described in detail hereinafter in conjunction with FIG. 6.

To enable light beams to come into the cavity 302 through the input optical path 100 and be output from the output optical path 201 after passing through the upper cavity 304, the upper inducing plate 308 is connected with a negative end of a power supply, the lower inducing plate 309 is connected with a positive end, and a bottom-up electrical field is formed in the cavity 302. Strength of the electrical field is determined by the electric potential difference between the upper and lower inducing plates 308 and 309. Then, electrons are implanted into the elastic light guiding plate 306 and the electrons concentrate in the free end of the elastic light guiding plate 306, so that the free end moves to the lower inducing plate 309 under the electrical field force. As long as the electrical field strength formed in the cavity 302 is great enough to counteract the elastic force generated while bending the elastic light guiding plate 306, the free end of the elastic light guiding plate 306 will come into contact with the bottom of the cavity 302. Here, from a view facing the section of the cavity 302, the lower cavity 305 is closed by the elastic light guiding plate 306. Therefore, the light beams coming to the cavity 302 through the input optical path 100, are reflected multiple times on the internal surfaces of the cavity 302 and the surfaces of the elastic light guiding plate 306 and then only pass through the upper cavity 304, namely, the light beams are selectively routed to the output optical path 201.

In contrast, to enable light beams to come into the cavity 302 through the input optical path 100 and to be output from the output optical path 202 after passing through the lower cavity 305, the upper and lower inducing plates 308 and 309 are electrified, and a reversed electrical field is formed in the cavity 302, so that the free end moves to the upper inducing plate 308 and comes into contact with the top of the cavity 302, thereby closing the cavity 302. Therefore, the light beams only pass through the lower cavity 305 and are selectively routed to the output optical path 202.

The optical path switch has an alternative structure and provides a selective routing from one input optical path to two output optical paths. However, a router is generally required to have a multiple-input multiple-output function. Therefore, a router supporting multiple selective paths can be formed by connecting multiple switches described in the above embodiments in series.

Another embodiment of the present disclosure provides an optical router including at least one optical path switch described above. The optical router includes: at least one input end, multiple output ends, and at least one stage of alternative optical path switches. The input end is connected with an input optical path of an optical path switch in a first stage, the multiple output ends are connected with output optical paths of optical path switches in a last stage, and an input optical paths of an optical path switch in each stage is connected with an output end of an optical path switch in a former stage. In the first stage, one original input is switched into two outputs, in a second stage, four outputs are obtained because each of the two inputs is switched into two outputs, and so on and so forth, in the last stage, multiple outputs are obtained. In other words, by the optical router, the original input is switched into multiple outputs.

Figure 7:
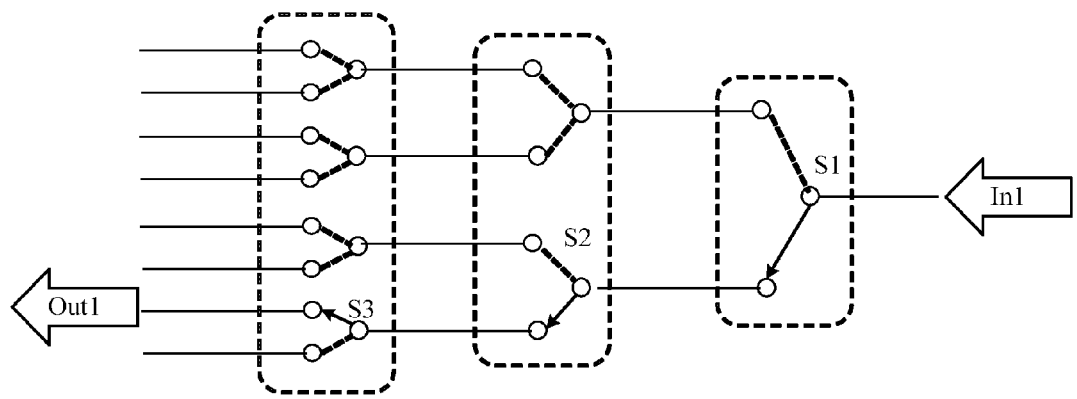
FIG. 7 is a structural schematic view of an optical router in an embodiment of the present disclosure.

FIG. 7 is a structural schematic view of an optical router in an embodiment of the present disclosure. As shown in FIG. 7, the optical router includes: an input end, seven optical path switches in three stages, and eight output ends. Light beams are input through the input end, pass through optical path switches in three stages, and are output through the output ends. For example, when light beams are required to be routed from an input end In1 to an output end Out1, the beams firstly come into an optical path switch S1 in a first stage from the input end In1, pass through an optical path switch S2 in a second stage after a first alternative selective routing, pass through an optical path switch S3 in a third stage after a second alternative selective routing, and are output by the output end Out1 after passing through an optical path switch S3 in the third stage.

Figure 8:
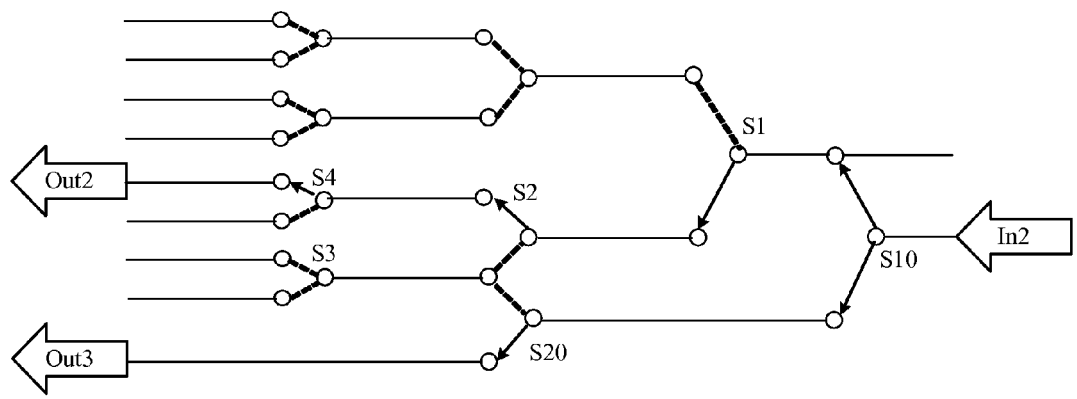
FIG. 8 is a structural schematic view of an optical router in another embodiment of the present disclosure.

FIG. 8 is a structural schematic view of an optical router in another embodiment of the present disclosure. As shown in FIG. 8, compared with the optical router shown in FIG. 7, an additional input optical path, and optical path switches S10 and S20 connected in serial are added. An output optical path of the optical path switch S10 is connected with an input optical path of the optical path switch S1, and an output optical path of the optical path switch S20 is connected with an input optical path of the optical path switch S3. Compared with the optical router shown in FIG. 7, when light beams are routed from the input end to the output end, the number of optical path switches and the number of stages that light beams pass through is indefinite, in other words, the alternative selective routing is more flexible. For example, when light beams are required to be routed to the output end Out2, the light beams firstly come into the optical path switch S10 from the input end In2, pass through the optical path switches S1, S2 and S4 sequentially after multiple-stage selective routings and then are output by the output end Out2. Here, the switches S1, S2 and S4 respectively perform selective routings in the second, third and fourth stage. Referring to FIG. 8, when light beams are required to be routed to the output end Out3 from the input end In2, the beams only have to pass through the optical path switches S10 and S20 in two stages of selective routings.

Furthermore, optical routers may be formed by flexible combination and separation of the optical path switches according to practical requirements, which is not described in detail herein. And those skilled in the art may freely broaden use of the optical routers within the scope of the present disclosure, to form more complex optical routers for different applications.

According to the embodiments of the present disclosure, the optical router uses the optical path switches as optical path nodes, which has a simple structure, and can be easily controlled. Moreover, after passing through an alternative selective routing, there is no lateral offset for light beams in the conventional reflector matrix, and even if after multiple stages of selective routing, there is no accumulated offset error caused in the optical router.

Although the present disclosure has been disclosed as above with reference to preferred embodiments, it is not intended to limit the present invention. Those skilled in the art may modify and vary the embodiments without departing from the spirit and scope of the present invention. Accordingly, the scope of the present disclosure shall be defined in the appended claim.

What is claimed is:

1. An optical path switch, comprising:
an input optical path, two output optical paths and an optical path switching element, wherein the optical path switching element is adapted for selective routing light beams from the input optical path to one of the output optical paths, and comprises:
a semiconductor substrate, an inter layer dielectric layer on the substrate, a cavity in the inter layer dielectric layer, wherein an end of the cavity is connected with the input optical path, the other end is partitioned into an upper cavity and a lower cavity by an isolating layer, the upper and lower cavities are respectively connected with the two output optical paths; and
an elastic light guiding plate in the cavity, wherein the elastic light guiding plate comprises a reflecting material and comprises a fixed end connected with the isolating layer and a free end facing the input optical path and suspending in the cavity, wherein the free end can move between the top and bottom of the cavity under a force field exerted in the cavity.

2. The optical path switch according to claim 1, wherein the optical path switching element further comprises an upper inducing plate and a lower inducing plate which are respectively located above the top and below the bottom of the cavity, wherein a force field perpendicular to an optical transmission path is formed by electrifying the upper and the lower inducing plates in the cavity, and the free end of the elastic light guiding plate is in the force field.

3. The optical path switch according to claim 2, wherein the upper and lower inducing plates are configured on the walls of the cavity or as a part of the walls of the cavity.

4. The optical path switch according to claim 3, wherein a part of the walls of the cavity equipped with the upper and lower inducing plates are insulated from the rest part.

5. The optical path switch according to claim 2, wherein the upper and lower inducing plates are located in the inter layer dielectric layer and are insulated from the walls of the cavity by the inter layer dielectric layer.

6. The optical path switch according to claim 1, wherein the semiconductor substrate comprises a silicon substrate or a silicon on insulation substrate.

7. The optical path switch according to claim 1, wherein a reflecting coating is formed on the internal surfaces of the cavity.

8. The optical path switch according to claim 1, wherein the walls of the cavity comprise metal.

9. The optical path switch according to claim 8, the metal comprises one selected from aluminum, titanium, zinc, silver or a combination thereof.

10. The optical path switch according to claim 9, wherein the surfaces of the elastic light guiding plate are formed with a silicon oxide or silicon nitride film thereon.

11. The optical path switch according to claim 9, wherein the elastic light guiding plate comprises one selected from aluminum, titanium, zinc, silver or a combination thereof.

12. The optical path switch according to claim 1, wherein the elastic light guiding plate comprises metal.

13. The optical path switch according to claim 1, wherein a width of the free end of the elastic light guiding plate is greater than a width of the fixed end.

14. The optical path switch according to claim 13, wherein a section of the cavity perpendicular to the optical paths is a rectangle, and a width of the section gradually reduces along a direction extending from the free end of the elastic light guiding plate to the fixed end to keep clearance between the elastic light guiding plate and the walls of the cavity have a consistent width.

15. The optical path switch according to claim 1, wherein the upper and lower cavities are filled with a non-light tight material.

16. The optical path switch according to claim 15, wherein the upper and lower cavities are filled with quartz or glass comprising silicon dioxide.

17. An optical router comprising multiple stages of optical path switches as described in claim 1, comprising:
    at least one input end, and multiple output ends, wherein the input end is connected with an input optical path of an optical path switch in a first stage, the output ends are connected with output optical paths of the optical path switches in a last stage, and input optical paths of each optical path switch in each other stage are connected with an output end of an optical path switch in a former stage.

* * * * *